(No Model.)
H. ROEPER.
MOTOR.
No. 297,537. Patented Apr. 22, 1884.
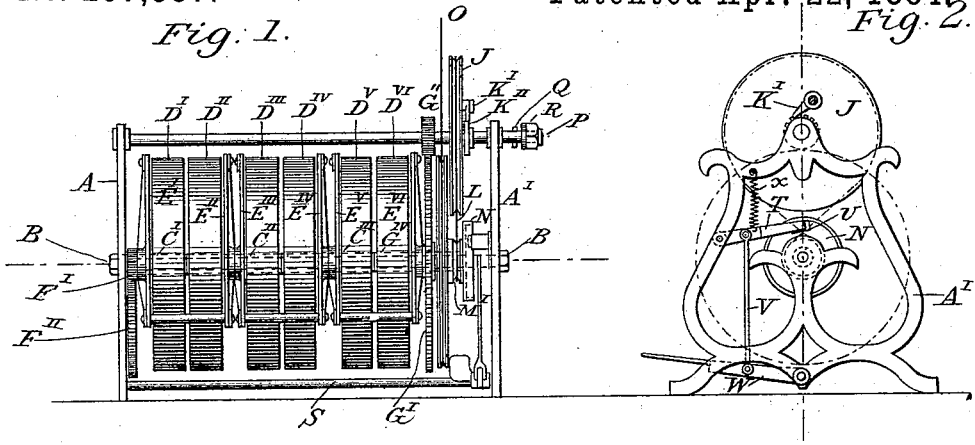
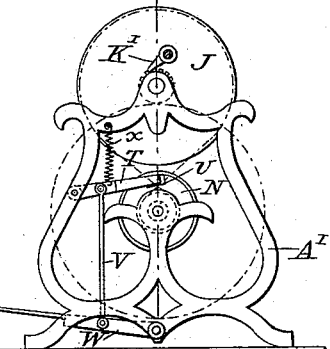
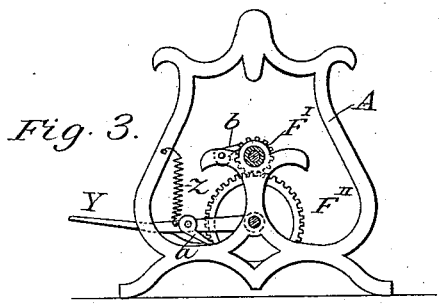
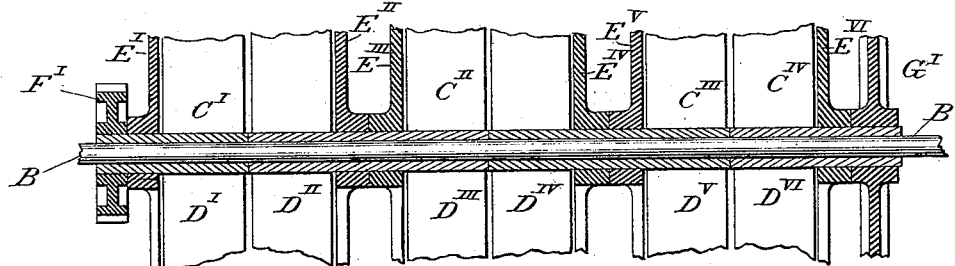
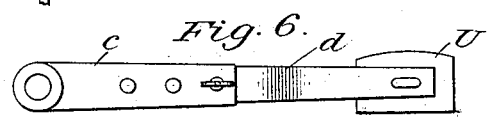
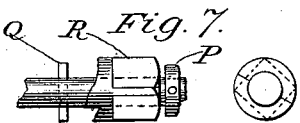
Witnesses
Charles Zane
Albert Mathews
Inventor:
Hermann Roeper.
N. PETERS, Photo-Lithographer, Washington, D. C.

UNITED STATES PATENT OFFICE.

HERMANN ROEPER, OF PHILADELPHIA, PENNSYLVANIA.

MOTOR.

SPECIFICATION forming part of Letters Patent No. 297,537, dated April 22, 1884.

Application filed June 5, 1883. Renewed March 31, 1884. (No model.)

*To all whom it may concern:*

Be it known that I, HERMANN ROEPER, a resident of the city of Philadelphia, State of Pennsylvania, residing at 906 Walnut street, Philadelphia, Pennsylvania, have invented a new and useful Improvement in Spring-Motors for Sewing-Machines, of which the following is a full, clear, and exact description, reference being had to the annexed drawings, making part thereof.

My invention relates to spring-motors designed most particularly to drive sewing-machines or any other kind of light machinery.

It consists of a series of coiled flat springs arranged on a succession of hollow shafting and supported by a longitudinal bar. The springs are arranged in couples and connected by two shields and stays. Their power is transmitted by means of cog-wheels, pulleys, and belts to the machine which is to be run. The springs are wound up by foot or hand, as will be described hereinafter, and the power is regulated by a special device, which I call a "speed-regulator," which will be more fully described in the following specification.

In the drawings, Figure 1 is an elevation; Fig. 2, a cross view from the right-hand side; Fig. 3, the same from the left-hand side. Fig. 4 shows one of the springs and its shield. Fig. 5 is an enlarged view showing the arrangement of the springs. Fig. 6 is a view of a detail, whose use and purpose will be described hereinafter. Fig. 7 is an enlarged view of the head of winding-shaft.

In Fig. 1, A A' are cast-iron side frames. B B is a longitudinal shaft passing through said frames, and attached to it by means of nuts and suitable screws projecting on either end of the shaft. $C'\ C''\ C'''\ C^{iv}$ are hollow sleeve-shafts riding loosely on said shaft B B. $D'\ D''\ D'''\ D^{iv}\ D^{v}\ D^{vi}$ are flat coiled springs alternately coiled right and left, which are attached to said loose sleeve-shafts $C'\ C''\ C'''\ C^{iv}$. $E'\ E''\ E'''\ E^{iv}\ E^{v}\ E^{vi}$ are three armed shields, as shown in a detached view in Fig. 4. Each two of these shields are connected by three stays, the springs being attached to one of said stays in the manner shown in Fig. 4. $F'\ F''$ are two spur-wheels, the former being keyed onto the sleeve-shaft $C'$ and gearing into $F''$. The object and purpose of said wheels will be explained hereinafter. $G'$ is a spur-wheel, which is keyed onto the sleeve-shaft $C^{iv}$, and gearing into the spur-wheel $G''$, rigidly attached to a longitudinal shaft, H, which bears in suitable bearings in the side frames, A A'. J is a grooved pulley on said shaft H, which is capable of turning only in one direction, and its movement in the opposite direction being prevented by a retaining-pawl, K', carried by the pulley J, and working into a ratchet-wheel, K'', the latter being rigidly attached to said shaft H. The pulley J connects by an endless rope or band, L, to a small pulley, M', the whole connection of pulleys M' M'' and disk N being made to turn freely on the shaft B B. An endless rope or band, O, or other convenient substitutes, connect the pulley M'' to machine or mechanism for whose propulsion the motor may be employed. One end of the shaft H carries a washer, P, a pin, Q, and a loose piece, R. (See enlarged view in Fig. 7.) Said piece R has a square to receive a crank for winding the motor, and slides and turns freely on the shaft H, but can be brought in contact with the pin Q by means of suitable projections on the piece R. The projections being screw-shaped, they will only engage with the pin Q by turning the crank and piece R in one direction, whereas they will not catch when turning the crank the other way.

Fig. 2 shows an arrangement intended for the regulation of the speed. It consists in the circular disk N, mentioned above, spring A', lever T, (shown in a large scale in Fig. 6,) a sliding block, U, a link or rod, V, a treadle, W, and a spring, X.

Fig. 3 shows a winding-gear, which is supposed to be worked by the foot. It consists in the treadle Y, the spring Z, the spur-wheels F' F'', and the two pawls $a$ and $b$, which work into the spur-wheels F' F'' and allow these wheels to turn in one direction only. The wheel F' is fixed onto the sleeve-shaft C', (see Fig. 1,) whereas F'' turns loosely on a stud.

Fig. 4 is a detached view of one spring and a side shield.

Fig. 5 is an enlarged sectional view of the sleeve-shafts C′ C″ C‴ C$^{iv}$, the main shaft B B, also showing the wheel F′ keyed onto sleeve-shaft C′, and parts of the side shields, E′ E″ E‴ E$^{iv}$ E$^{v}$ E$^{vi}$, and the spur-wheel G′.

Fig. 6 is an enlarged view of the spring-lever T. (See Fig. 2.) It consists in the piece c, the flat spring d, the sliding piece U, the studs e and f for the attachment of the spring d and the spring X, the link V, (see Fig. 2,) and a bat-winged screw. The latter serves for the adjustment of the spring d, which presses the sliding block U onto the circular disk N. A small projection on the piece U fits into a corresponding hole in the spring d, thus connecting the sliding piece U to the spring d, and allowing the former to adjust itself to the face of the disk N.

Fig. 7 is an enlarged view of the head of shaft H, and has been described above.

Having described the details of the motor, I now shall explain the working of the same and the manipulations connected with its use.

The winding up is effected by the gearing shown in Fig. 3. By pressing down the treadle Y the pawl a will push the wheel F′, which, being fixed onto the hollow shaft C′, will partly wind up spring D′. By releasing the pressure on the treadle Y the tension of the spring Z will lift the treadle again, back motion of the wheels being prevented by the pawl b engaging in the wheel F′, and thus by the up-and-down movement of the treadle Y the sleeve-shaft C′ will be turned and the spring D′ be wound. The motor may also be wound by hand by means of a crank fitting onto the square piece R on the shaft H. Said square piece R is brought into contact with the pin Q by means of the projections on the piece R. Thus by turning the crank and the shaft H the wheel G″ will be turned, which, gearing into G′, fixed on the sleeve-shaft C$^{iv}$, will turn the latter, and with it wind the spring D$^{vi}$. The pulley J, being engaged with the shaft by means of the retaining-pawl K′ and ratchet-wheel K″, will remain stationary while the motor is being wound, whereas it will come into operation when the motor is working.

In order to explain the connection and working of the springs, let it be supposed that the sleeve-shaft C$^{iv}$ is being turned in the above-described manner. Then the spring D$^{iv}$ will receive a certain amount of tension, tending to turn the shields E$^{vi}$ and E$^{v}$, which are rigidly connected by stays, as described above. Spring D$^{v}$ having its coils in the reverse direction to those of D$^{vi}$, and being attached with its outside coil to the same stay as D$^{vi}$, and its inside coil to a second sleeve-shaft, C‴, will commence being wound from the outside whenever the tension in spring D$^{vi}$ is sufficient to overcome the resistance of the friction and the spring D$^{v}$. Spring D$^{v}$, being fixed on the same sleeve-shaft as D$^{iv}$, will in a similar way wind D‴ from the inside, whereas D$^{iv}$ in its turn will wind D‴ from the outside, and so on to D′. Spring D′ is fixed onto the sleeve-shaft C′, which is kept stationary by the wheel F′ and the retaining-pawl b. (See Fig. 3.) When the motor is wound by foot, the same process takes place in the reverse way, spring D′ being the first spring to be wound and D$^{vi}$ the last. The means for keeping the sleeve-shaft C$^{iv}$ from turning while the springs are being wound by foot will be presently explained in describing the mechanism for regulating the speed of the motor and its power. (See Fig. 2.) The sliding block U is pressed onto the circular disk N by an elastic spring, d, (see Fig. 6,) and the friction of the sliding block against the disk will retard the revolving movement of the disk in a measure as the block approaches the circumference of the disk, and the pressure of the spring has to be so adjusted by means of the adjusting-screw, Fig. 6, that it brings the disk to a standstill when the block is pressing against the projection on the circumference of the disk. As the sliding block approaches the center of the disk, the resistance to the turning of the disk will become less, and consequently the speed of the motor will be increased. The shifting of the block U is effected by the treadle W, the link V, the spring-lever T, and the spring X. By pressing the treadle down with the foot the spring-lever T by a corresponding movement carries the sliding block U toward the center of the disk, and thus increases the speed, whereas the spring X, after releasing the pressure on the treadle, will carry the block U back again and force it against the circular projection on the circumference of the disk N, and stop the motor from running.

My claims are—

1. In a spring-motor, the combination of frames A A′, a longitudinal shaft, B B, a spur-wheel, F′, a retaining-pawl, b, a series of hollow sleeve-shafts, C′ C″ C‴ C$^{iv}$, a number of shields and stays, E′ E″ E‴ E$^{iv}$ E$^{v}$ E$^{vi}$, a spur-wheel, G, a spur-wheel, G″, a shaft, H, a pulley, J, a retaining-pawl, K′, and ratchet-wheel K″, pulleys M′ and M‴, and a rope or band, L, substantially as described above.

2. In a spring-motor, the combination of a treadle, Y, retaining-pawl a, spur-wheels F″ F′, retaining-pawl b, sleeve-shaft C′ and longitudinal shaft B B, and the two frames, A A′, substantially as described above.

3. In a spring-motor, the combination of the two frames A A′, a shaft, H, a pin, Q, a square piece, R, a washer, P, a pulley, J, a retaining-pawl, K′, a ratchet-wheel, K″, spur-wheels G′ and G″, a shaft, B B, a series of hollow sleeve-shafts, C$^{iv}$ C‴ C″ C′, a series of springs, D$^{vi}$ D$^{v}$ D$^{iv}$ D‴ D″ D′, a number of shields and stays, E$^{vi}$ E$^{v}$ E$^{iv}$ E‴ E″ E′, a spur-wheel, F′, and a retaining-pawl, b.

4. In a spring-motor, the combination of a treadle, W, a link, V, a spring-lever, T, a sliding block, U, a spring, d, a spring, X, a circular disk, N, pulleys M′, M″, and J, a rope or band, L, a shaft, H, spur-wheels G' G'', a shaft, B B, and a sleeve-shaft, C$^{iv}$, &c., substantially as set forth.

5. In a spring-motor, the combination of two frames, A A', the treadle Y, retaining-pawl $a$, spring Z, wheels F'' F', retaining-pawl $b$, shaft B B, sleeve-shafts C' C'' C''' C$^{iv}$, shields E' and E'' E''' E$^{iv}$ E$^{v}$ E$^{vi}$, springs D' D'' D''' D$^{iv}$ D$^{v}$ D$^{vi}$, spur-wheels G' G'', shaft H, pin Q, piece R, washer P, pulley J, retaining-pawl K', ratchet-wheel K'', pulleys M' M'', bands L and O, circular disk N, sliding block U, spring-lever T, spring X, link V, and treadle W, substantially as described.

HERMANN ROEPER.

Witnesses:
CHARLES ZANE,
JONATHAN H. GREENE.